United States Patent [19]

Yamada et al.

[11] 4,365,273

[45] Dec. 21, 1982

[54] PICTURE DATA COMPRESSING METHOD

[75] Inventors: Mitsuhiko Yamada; Toshiaki Nakade, both of Kyoto, Japan

[73] Assignee: Dainippon Screen Seizo Kabushiki Kaisha, Kyoto, Japan

[21] Appl. No.: 201,732

[22] Filed: Oct. 29, 1980

[30] Foreign Application Priority Data

Nov. 5, 1979 [JP] Japan ............... 54-142904

[51] Int. Cl.³ .............................. H04N 7/12
[52] U.S. Cl. ....................... 358/260; 358/133; 364/515
[58] Field of Search ............ 358/260, 280, 133; 364/515

[56] References Cited

U.S. PATENT DOCUMENTS 4,150,401 4/1979 Yamamoto .................. 358/260
4,155,097 5/1979 Lux ........................... 358/260
4,189,748 2/1980 Reis .......................... 358/260
4,231,095 10/1980 Cassagne .................... 358/260

*Primary Examiner*—Howard Britton

[57] ABSTRACT

A method for compressing picture data, wherein an original picture is scanned photoelectrically to obtain analog picture signals which are converted in an analog-digital converter into picture data to be transmitted or stored in a memory, wherein each of a matrix of picture data having addresses is compared with an adjacent picture data in horizontal, vertical, right upper diagonal and left upper diagonal directions to obtain comparison results, and wherein either each picture data or its adjacent picture data is skipped according to the comparison results when the two picture data have the same value, to obtain compressed data consisting of representative data which cannot be skipped.

5 Claims, 26 Drawing Figures

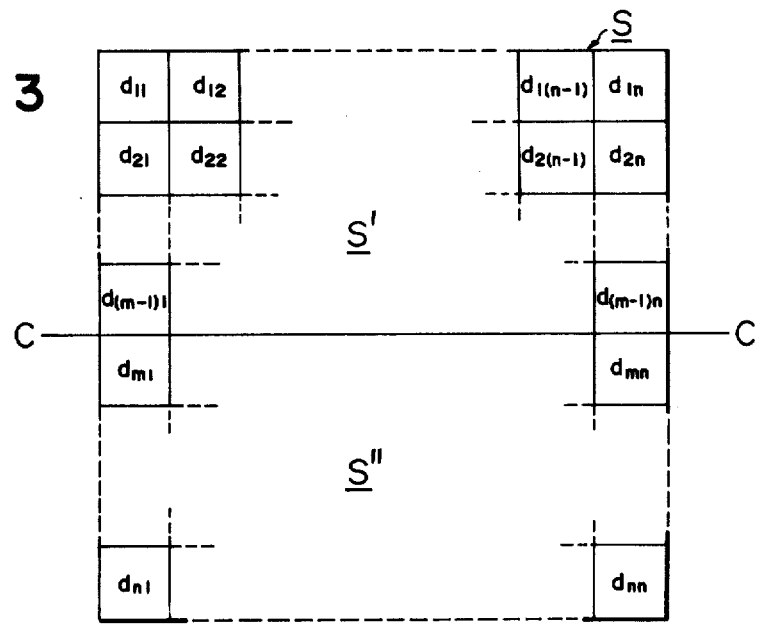

$D = d_{11} \cdot d_{13} \cdot d_{23}$ $D = d_{11} \cdot d_{12} \cdot d_{21} \cdot d_{22}$

FIG. 17

| $d_{11}$ $d_{12}$ $d_{13}$ $S_{11} \rightarrow$ $d_{21}$ $d_{22}$ $d_{23}$ $d_{31}$ $d_{32}$ $d_{33}$ | $S_{12}$ | $S_{13}$ $\underline{Z}$ |
|---|---|---|
| $S_{21}$ | $S_{22}$ | $S_{23}$ |
| $S_{31}$ | $S_{32}$ | $S_{33}$ |

FIG. 18

| $S_{11}$ ($I_{11}$, $D_{11}$) | $S_{12}$ ($I_{12}$, $D_{12}$) | $S_{13}$ ($I_{13}$, $D_{13}$) $\underline{Z}$ |
|---|---|---|
| $S_{21}$ ($I_{21}$, $D_{21}$) | $S_{22}$ ($I_{22}$, $D_{22}$) | $S_{23}$ ($I_{23}$, $D_{23}$) |
| $S_{31}$ ($I_{31}$, $D_{31}$) | $S_{32}$ ($I_{32}$, $D_{32}$) | $S_{33}$ ($I_{33}$, $D_{33}$) |

PICTURE DATA COMPRESSING METHOD

BACKGROUND OF THE INVENTION

This invention relates to a method for compressing picture data in order to reduce capacity of a memory and transmitting time for the data, in a picture reproducing machine.

In a conventional picture reproducing machine such as a layout color scanner, when the processing order of the data is changed, picture signals obtained by scanning an original picture photoelectrically are once stored in a memory using a magnetic disc, a magnetic tape, or the like, and then the picture signals read out of the memory are processed. In this case, therefore, a memory having a large capacity is required and a lot of processing time is also required.

For example, generally the scanning is carried out with the conditions of 200 scanning lines per centimeter in the direction of cylinder's axis and a sampling pitch of $5 \times 10^{-3}$ cm in the direction of cylinder's periphery. Accordingly, when a picture image is reproduced on a photosensitive material of $70 \times 50$ cm, the entire picture elements required are calculated as follows.

$$70 \times 200 \times [50/(5 \times 10^{-3})] = 1.4 \times 10^8$$

If density data of a picture element is written by a binary code of eight bits (one byte), in order to store the entire picture elements required to such a photosensitive material, 140 megabytes of capacity is required for one color, and thus 560 megabytes for four colors. This method requires a memory having a large quantity of capacity and thus involves a long time for the processing.

In a conventional data compression method used in a facsimile, or the like, the picture element is compared with the following one along only one scanning line and is discriminated whether the two are the same or not one after another, viz., if one picture element is black, the following one is discriminated to be black or white, and then run lengths of element of the same color, i.e. black or white, are discriminated. However, this method is too simple to be applied to a picture having continuous tone in a color scanner, and thus this method is not practicable.

SUMMARY OF THE INVENTION

It is an object of the present invention to provide a method for compressing picture data for use in a picture reproducing machine free from the aforementioned defects and which reduces capacity of a memory and time for processing, and which is stable and reliable.

According to the present invention there is provided a method for compressing picture data, wherein an original picture is scanned photoelectrically to obtain analog picture signals which are converted in an analog-digital converter into picture data to be transmitted or stored in a memory, comprising the steps of (a) comparing each of a matrix of picture data having addresses with an adjacent picture data in horizontal, vertical, right upper diagonal and left upper diagonal directions to obtain comparison results, and (b) skipping either each picture data or its adjacent picture data according to the comparison results when the two picture data have the same value, to obtain compressed data consisting of representative data which cannot be skipped.

BRIEF DESCRIPTION OF DRAWINGS

In order that the present invention may be better understood, a preferred embodiment will now be described with reference to the accompanying drawings, in which:

FIG. 3 is an enlarged view of the matrix of $n \times n$ picture element data which are divided into two parts having different information;

FIG. 4 shows matrices of $3 \times 3$ picture element data whose densities are compared with one another in directions indicated by arrows;

FIG. 17 shows a matrix of $3 \times 3$ minute areas for double compression according to a present method;

FIG. 18 shows a matrix of $3 \times 3$ minute areas together with their data;

DESCRIPTION OF A PREFERRED EMBODIMENT

Figure 1:
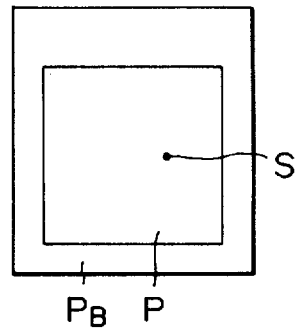
FIG. 1 shows an original picture film to be processed by a method according to the present invention.
Figure 2:
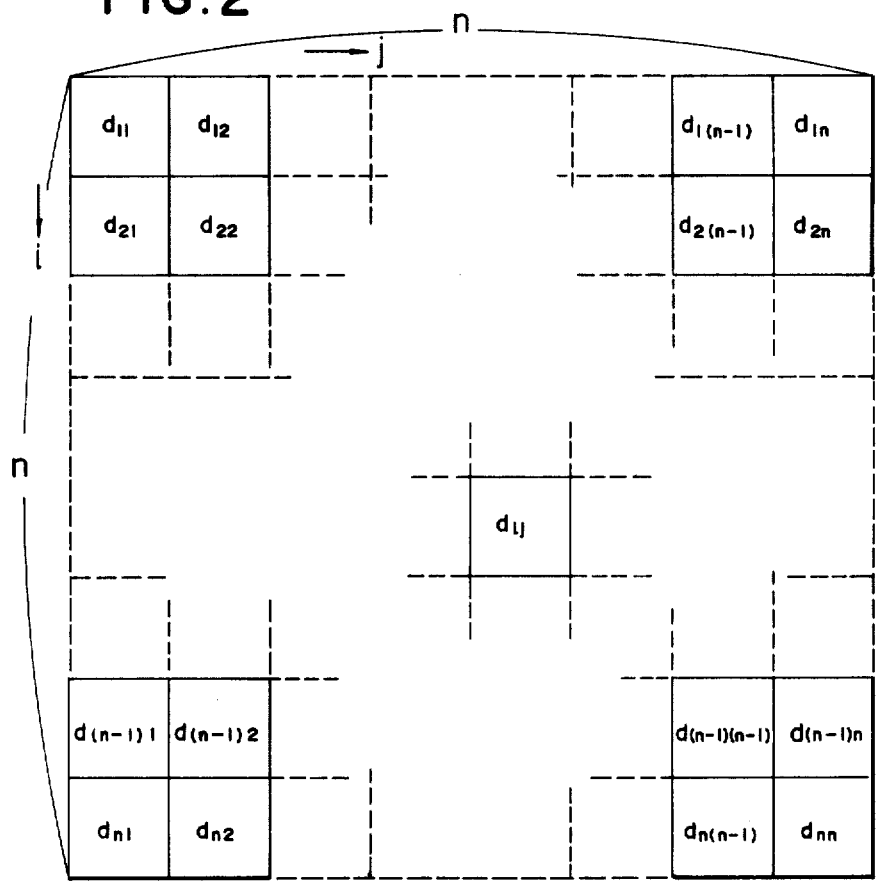
FIG. 2 is an enlarged view of a matrix of picture element data in $n \times n$ format of a matrix of picture elements which are obtained by dividing a minute area picked up from the original picture in FIG. 1.

Referring now to the drawings there is shown in FIG. 1 an original picture P on a base sheet $P_B$. A minute area S picked up from the original picture P is divided into a matrix of picture elements in $n \times n$ format, each picture element having a picture element data. In FIG. 2 there is shown a matrix of picture element data $d_{11}$–$d_{nn}$ in $n \times n$ format of the minute area S.

First, a principle of compression or reduction according to the present invention is described. Actually, a density data d of each of $n \times n$ picture element data $d_{11}$–$d_{nn}$ is very similar to that of its adjacent picture element data except a few particular cases. Therefore, in order to express the minute area S it is not necessary to use all picture element data, that is, the minute area S may be expressed by some picture element data representing the data groups of similar densities.

For example, as shown in FIG. 3, if the minute area S is divided into two parts S' and S'' by a line C—C, the density data of the picture element data $d_{11}$–$d_{(m-1)n}$ of the part S' are the same, and the density data of the picture element data $d_{ml}$–$d_{nn}$ of the part S'' are the same but are different from that of the part S', the minute area S is expressed by two representative picture element data $d_{11}$ and $d_{ml}$ of the parts S' and S''. In such a method, therefore, the $n \times n$ picture element data $d_{11}$–$d_{nn}$ are expressed by two representative picture element data $d_{11}$ and $d_{ml}$, i.e. the picture element data are largely compressed or reduced without lacking of any picture element data.

The picture element data $d_{11}$–$d_{nn}$ are divided into groups, each including picture element data having the same density data, which are adjacent to one another, in the same manner as described above. This grouping is carried out by comparing a density data d of a picture element data with that of an adjacent one in a horizontal, vertical, right upper diagonal or left upper diagonal X, Y, R or L direction, as shown in FIG. 4. Then, when the density of the one picture element data is the same as that of the other picture element data, either picture element data is omitted or skipped, and a pattern data indicating that the two picture element data compared have the same density, is made. When the density of the one picture element data is different from the that of the other picture element data, neither picture element data is omitted, and another pattern data indicating that the two data compared have the different densities, is made.

Figure 5:
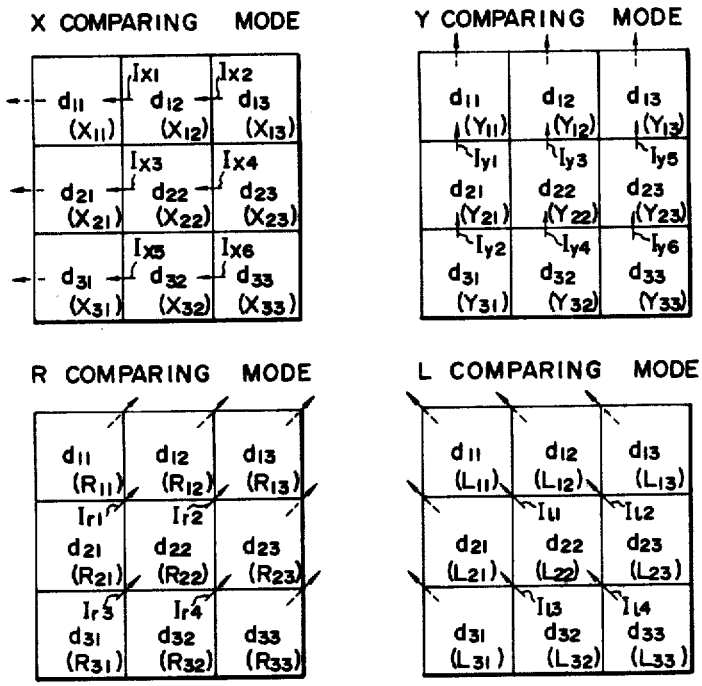
FIG. 5 shows the matrices of $3 \times 3$ picture element data, registers for storing them, and a relation between the comparing directions of the picture element data and register units for storing comparison results.

This process is described in connection with FIG. 5, wherein a matrix of $3 \times 3$ picture element data $d_{11}$–$d_{33}$ is shown. The comparison of each picture element data with an adjacent one in each X, Y, R or L direction is carried out in X, Y, R or L comparing mode. A relation between the picture element data $d_{11}14$ $d_{33}$ and groups of registers $X_{11}$–$X_{33}$, $Y_{11}$–$Y_{33}$, $R_{11}$–$R_{33}$, Ix, Iy, Ir and Il and the comparing direction of each picture element data are shown in FIG. 5.

For example, in the X comparing mode the density data d of each picture element data $d_{11}, \ldots d_{33}$ is converted into a binary code of eight bits and then is written in the corresponding register $X_{11}, \ldots$ or $X_{33}$ having the same address number as the picture element data, and also as the picture element.

An arrow shown by a solid line indicates a comparing direction where an adjacent picture element data to be compared is exist. For instance, the picture element data $d_{11}$ and $d_{12}$ are connected to each other with respect to the X direction, and the picture element data $d_{11}$ is to be compared with the picture element data $d_{12}$ to be processed. An arrow shown by a broken line indicates a comparing direction where no adjacent picture element to be compared is exist.

A symbol $Ix_1, \ldots$ or $Ix_6$ attached to the arrow shows each bit of the register Ix of six bits, wherein one-bit data indicating that the density data of the two picture element data are the same or different. The number 1–6 of the simbols $Ix_1$–$Ix_6$ indicate the address numbers $m_x$ of the bits, which are numbered consecutively from the lowermost figure.

The Y, the R or the L comparing mode is described in the same manner as the X comparing mode described above except that the registers Ir and Il are of four bits.

Figure 6:
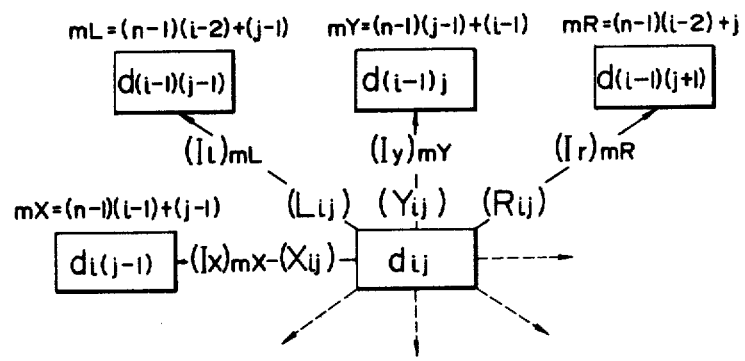
FIG. 6 shows a part of addresses of picture element data to compare with a certain picture element data in different directions and addresses of the corresponding registers.
Figure 7:
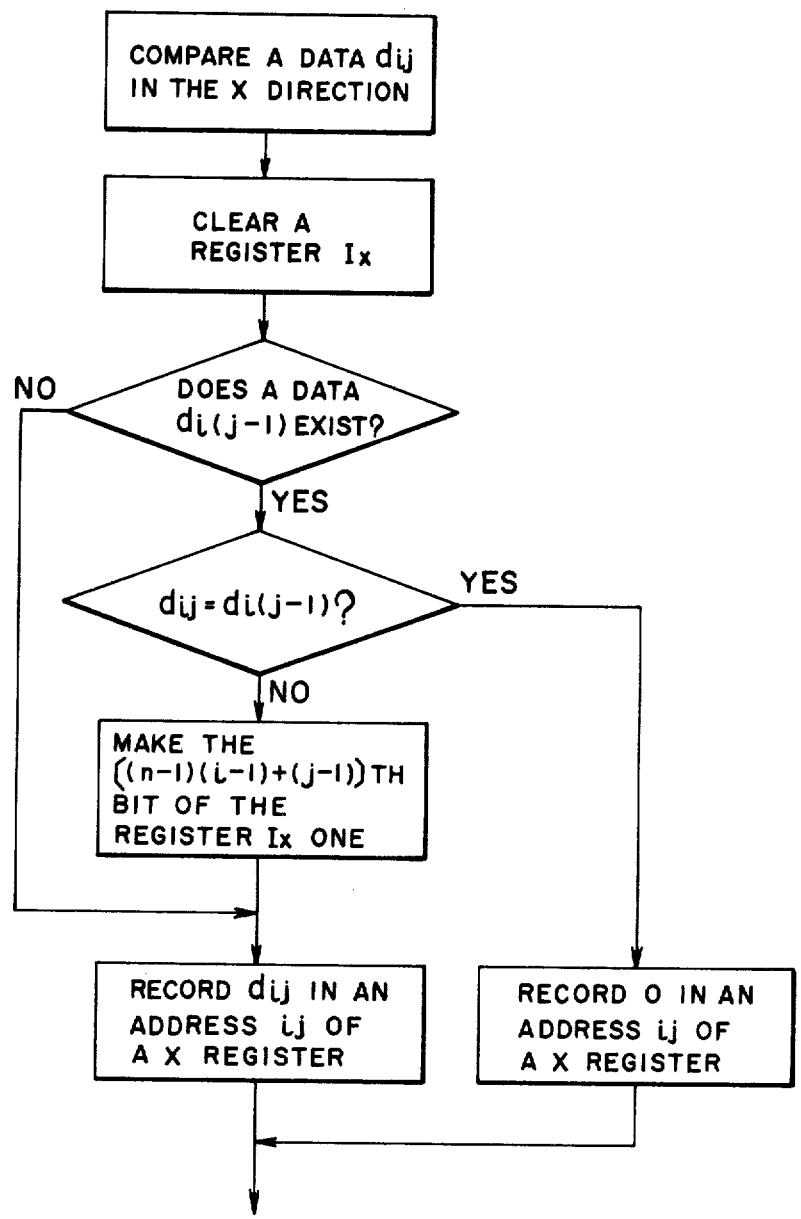
FIG. 7 shows a flow chart for comparing a picture element data in X direction.
Figure 8:
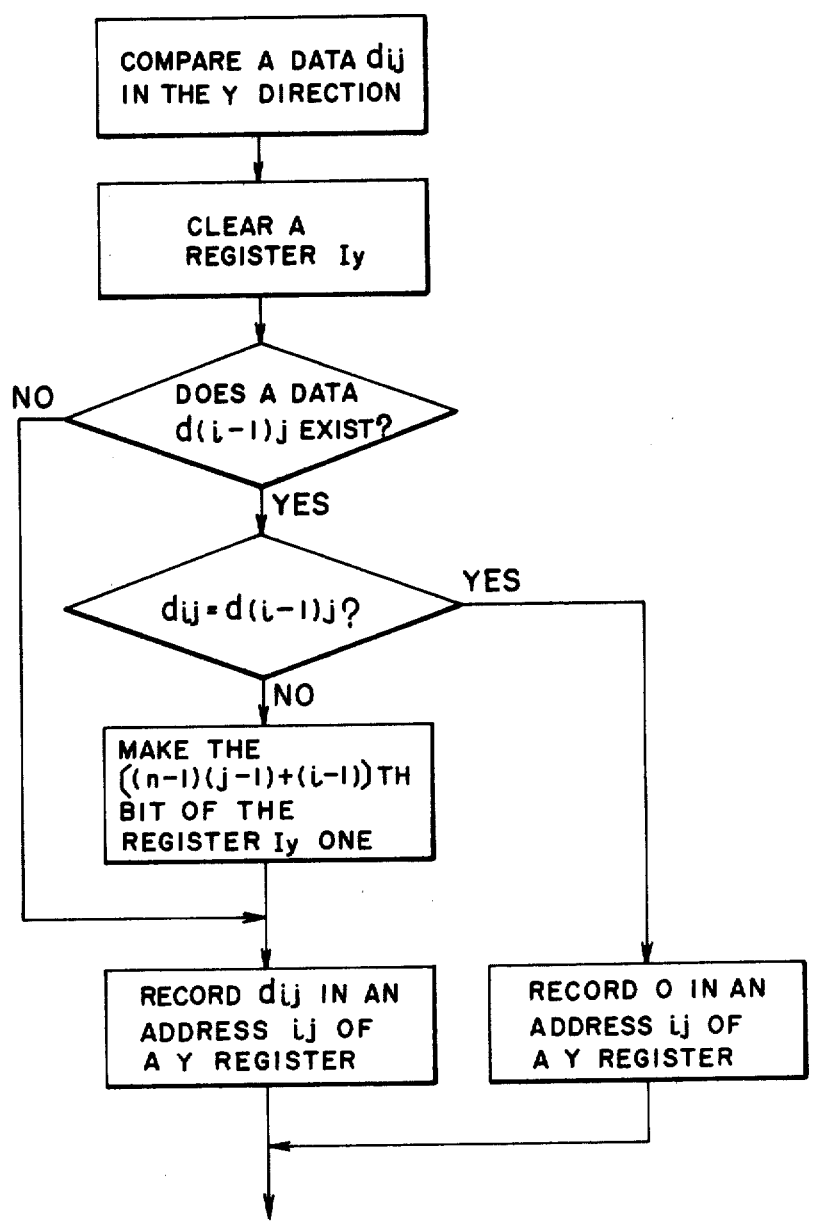
FIG. 8 shows a flow chart for comparing a picture element data in Y direction.
Figure 9:
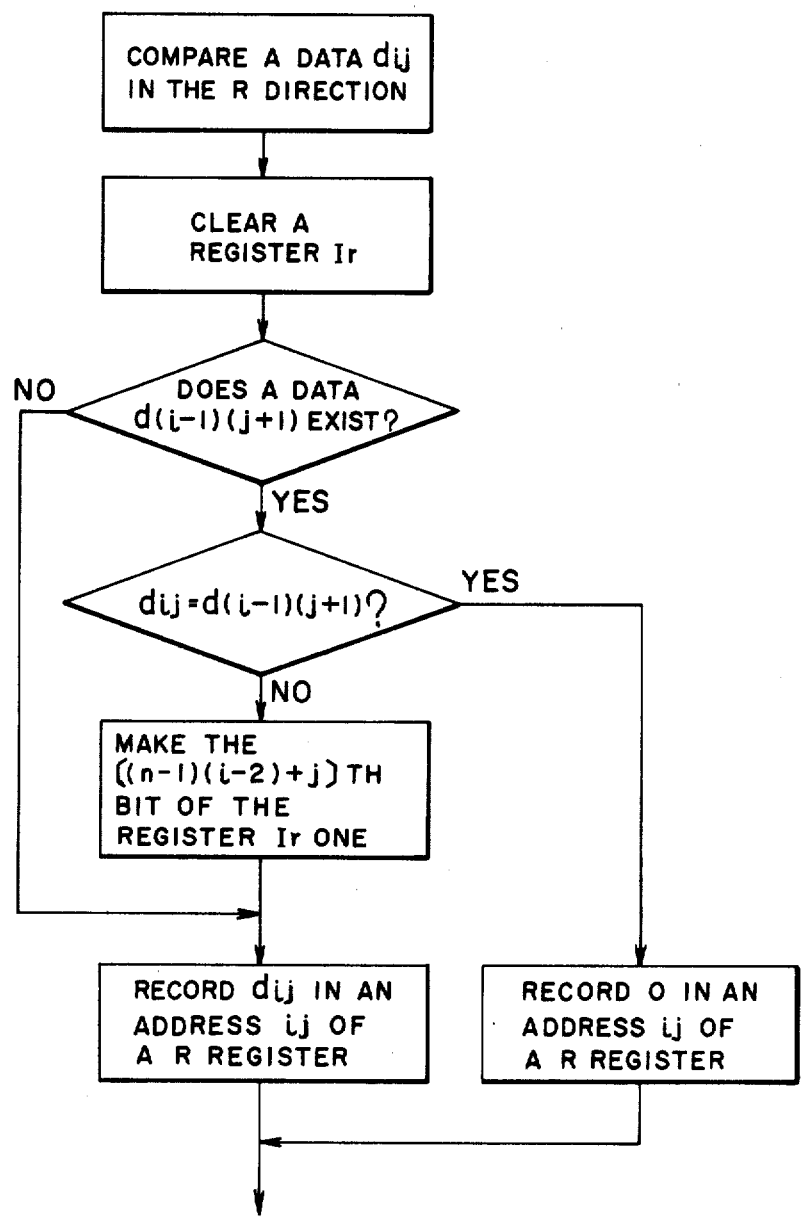
FIG. 9 shows a flow chart for comparing a picture element data in R direction.
Figure 10:
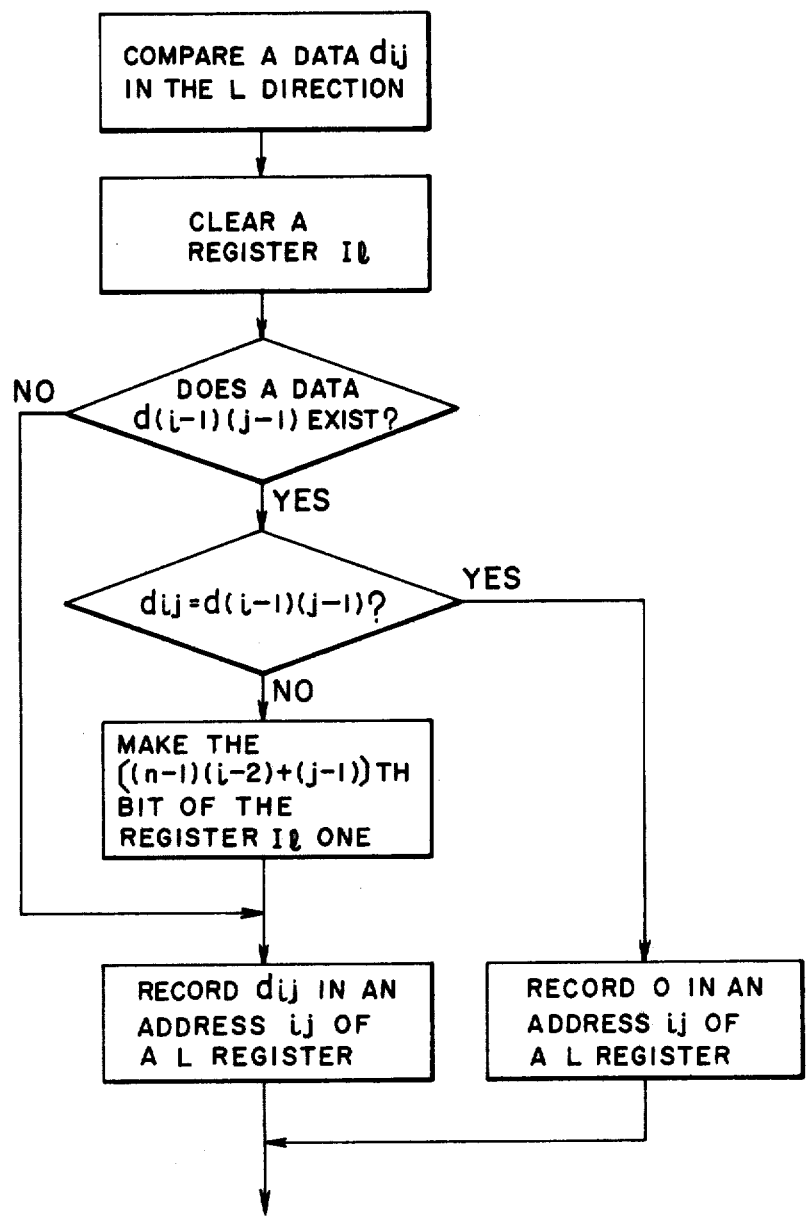
FIG. 10 shows a flow chart for comparing a picture element data in L direction.

In FIG. 6 is shown a part of addresses of picture element data $d_{ij}$ to be processed, hereinafter referred to as an objective data, in the X, Y, R and L directions (only one direction of each X, Y, R or L direction from the picture element data $d_{ij}$) and the addresses of the corresponding registers.

When the picture element data $d_{ij}$ to be processed is selected, adjacent picture element data $d_{i(j-1)}$, $d_{(i-1)j}$, $d_{(i-1)(j-1)}$ or $d_{(i-1)(j+1)}$ to be compared therewith in each comparing direction is determined.

There are also comparative data in the other comparing directions shown by broken lines in FIG. 6, but there is no need that these data are compared with the objective data $d_{ij}$.

The symbols on the solid arrow lines show the registers $X_{ij}$, $Y_{ij}$, $R_{ij}$ and $L_{ij}$ with the same address numbers as the objective data $d_{ij}$ for storing the density data of the objective data $d_{ij}$ when the comparisons are performed in the X, Y, R and L directions and the registers Ix, Iy, Ir and Il with the bit address numbers $m_x$, $m_y$, $m_r$ and $m_l$ for storing the comparison result data.

The bit address numbers $m_x$, $m_y$, $m_r$ and $m_l$ attached to the registers Ix, Iy, Ir and Il are numbered consecutively from the lowermost figure in the same manner as those in FIG. 5. From the above description it is readily understood that FIG. 5 shows the embodiment wherein n equals 3, i means 1–3, and j means 1–3.

In FIGS. 7–10 there are shown flow charts for comparing the objective data $d_{ij}$ with the comparative data in the X, Y, R and L directions.

FIGS. 6–10 show the general forms for comparing the objective data $d_{ij}$, and accordingly, in practice, n, i and j are determimed in each embodiment.

The flow charts, shown in FIGS. 7–10, for processing the comparison of the objective data $d_{ij}$ with the comparative data are the same except each comparing direction. Hence, only the one for the X direction, shown in FIG. 7, will be described.

In this operation, the picture element data $d_{11}, \ldots$ and $d_{nn}$ are adapted to be processed at the same time in parallel. At the start of the processing the register Ix is cleared in order that all bits of the register Ix may be zero. The explanation is carried out in connection with the objective data $d_{ij}$.

Then, the existence of the comparative data $d_{i(j-1)}$ of the objective data $d_{ij}$ is discriminated. When the comparative data does not exist, the density data of the objective data is written in the register $X_{ij}$ having the same address as that of the objective data When the comparative data exists, the density data of the objective and the comparative data are compared. When the two density data are the same, a zero value (for example, all bits are zero) is written in the register $X_{ij}$ to skip the objective data $d_{ij}$. When the two density data are different, the $[(n-1)(i-1)+(j-1)]$th bit of the register Ix is set to one, and the density data of the objective data $d_{ij}$ is written in the register $X_{ij}$. The bit number $[(n-1)(i-1)+(i-1)]$ of the register Ix corresponds to the comparing position between the objective data $d_{ij}$ and the comparative data $d_{i(j-1)}$, and the bit number $[(n-1)(i-1)+(j-1)]$ equals one means that the objective data $d_{ij}$ is not omitted.

All picture element data $d_{11}$–$d_{nn}$ are processed in the same manner as described above. In the registers $X_{11}$–$X_{nn}$, when the picture element data are skipped, the zero value is written in the corresponding registers having the same addresses as the data skipped, and the picture element data are not skipped, the density data of the picture element data which are not skipped, are written in the corresponding registers having the same addresses as the picture element data not skipped. In the register Ix, zero or one is recorded in the bits of the register Ix depending on the comparison result of the two data, as described above.

Then, in the Y, or R or the L mode, all the picture element data $d_{11}$–$d_{nn}$ are processed, that is, the density data of the picture element data which are not omitted or the zero value when the picture element data are not omitted, are written in the registers $Y_{11}$–$Y_{nn}$, $R_{11}$–$R_{nn}$ or $L_{11}$–$L_{nn}$, and the comparison results of the two picture element data are recorded in the register Iy, Ir or Il, in the same manner as described above.

From the recorded data in the registers $X_{11}$–$X_{nn}$, $Y_{11}$–$Y_{nn}$, $R_{11}$–$R_{nn}$ and $L_{11}$–$L_{nn}$ according to the flow charts shown in FIGS. 7–10, logic products of the picture element data having the same addresses, which are not skipped, are obtained and thus are written in the corresponding addresses of registers $T_{11}$–$T_{nn}$.

That is, in the registers $X_{ij}$, $Y_{ij}$, $R_{ij}$ and $L_{ij}$, either objective data $d_{ij}$ or zero is recorded. The logic product of the data written in the registers $X_{ij}$, $Y_{ij}$, $R_j$ and $L_{ij}$ is obtained, i.e. only when the density data d is recorded in all the registers $X_{ij}$, $Y_{ij}$, $R_{ij}$ and $L_{ij}$, the density data d is obtained as the logic produce, and in any other cases when zero is written in at least one of the registers $X_{ij}$, $Y_{ij}$, $R_{ij}$ and $L_{ij}$, zero is output as the logic product. Thus the obtained logic product d or zero is recorded in the register $T_{ij}$ having the same address as those of the registers $X_{ij}$, $Y_{ij}$, $R_{ij}$ and $L_{ij}$.

Therefore, only the picture element data which are written in the same addresses of all X, Y, R and L registers, i.e. the picture element data are not skipped in any comparing modes, are recorded in the registers $T_{11}$–$T_{nn}$.

For example, the picture element data (except zero) recorded in the registers $T_{11}$–$T_{nn}$ correspond to the picture element data $d_{11}$ and $d_{m1}$ representing the parts S′ and S″ shown in FIG. 3, and the recorded data in the registers Ix, Iy, Ir and Il correspond to the data representing density distribution patterns of the parts S′ and S″.

FIGS. 11–14 show some minute areas S having different density distribution patterns, which are expressed by the matrix of 3×3 picture element data $d_{11}$–$d_{33}$ recorded in the registers.

Figure 11:
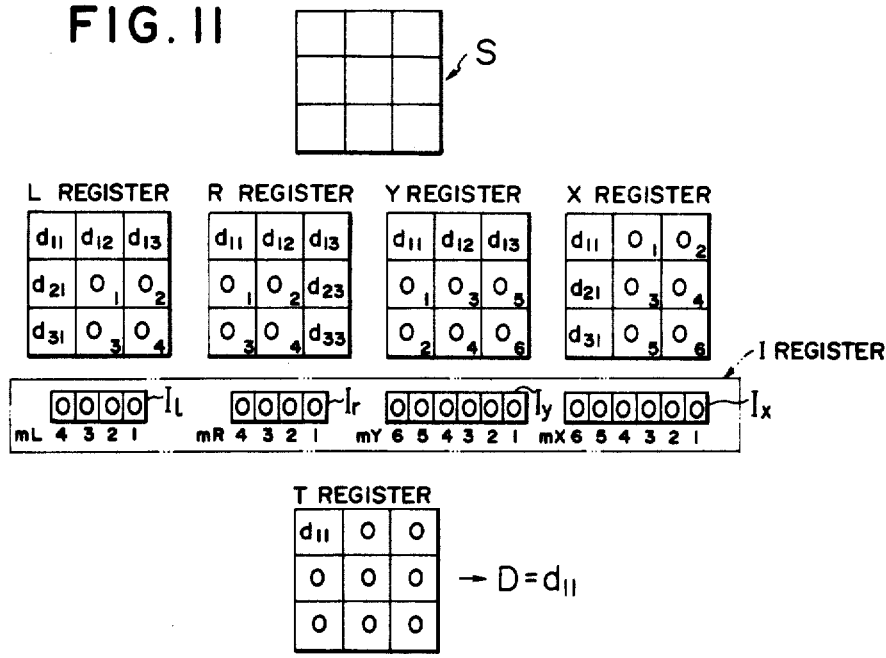
FIG. 11 is a schematic view of the picture element data of the minute area picked up and data written in registers when the density value of the picture element data is one.

In FIG. 11 are shown a minute area S in which the density distribution is uniform, and the X, the Y, the R, the L, and T and the I registers, i.e. $X_{11}$–$X_{33}$, $Y_{11}$–$Y_{33}$, $R_{11}$–$R_{33}$, $L_{11}$–$L_{33}$, $T_{11}$–$T_{33}$, and Ix–Il, for recording the picture element data in the comparison modes, the logic product data or once-compressed data, and the pattern data. The registers Ix, Iy, Ir and Il constitute the I register of 20 bits for storing one word.

In each X, Y, R or L register, only the density data of the object data to which no comparative data exists, are recorded, as shown in FIG. 5, and the objective data to which the comparative data exist, are recorded as zero. The addresses of the registers recording zero correspond to each bit of the I register, in which zero is recorded.

As shown in FIG. 11, only in the addresses 11 of the X-L registers the representative data $d_{11}$ except zero is recorded, and hence only the logic product $d_{11}$ of the data recorded in the addresses 11 of the X-L registers is recorded in the address 11 of the T register. A combination of obtained data $D=d_{11}$ recorded in the T register and pattern data recorded in the 20 bits of I registers are to be recorded, stored or transmitted as compressed data for picture image information of the minute area S.

The picture element data $d_{11}$–$d_{33}$ is expressed in eight bits, and thus the data of eight bits is recorded and transmitted. When the two data are compared with each other, the upper seven or six bits are preferably processed in order to remove a random component caused by a noise, or the like, which is included in the lowermost bit or bits and sometimes changes the density of the picture element data.

Figure 12:
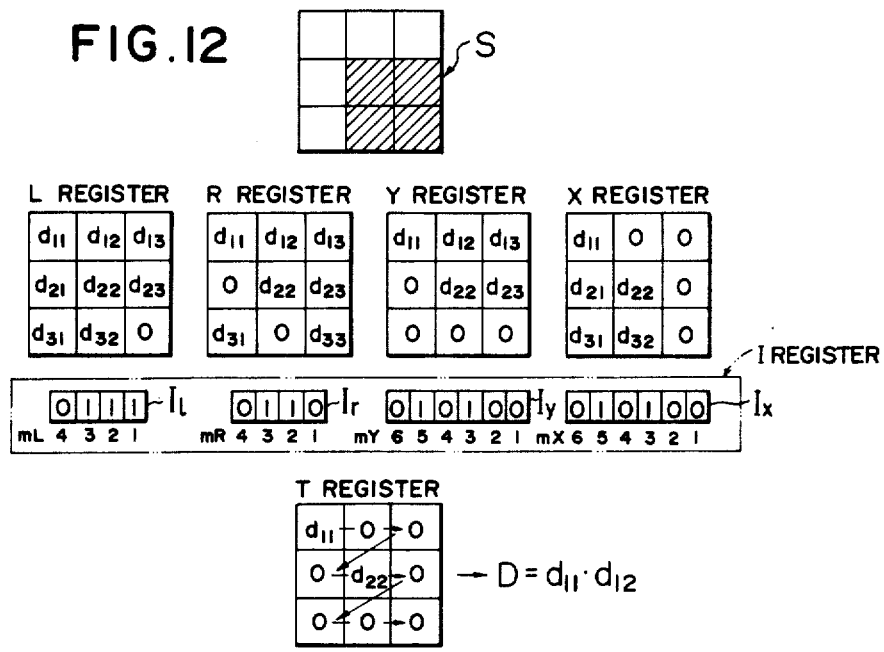
FIG. 12 is a schematic view of the picture element data of the minute area picked up and data written in registers when the density values of the picture element data are two.

In FIG. 12 are shown a minute area S in which there are two density distribution patterns, the X-L registers, the I register and the T register storing the data. In this embodiment, therefore, two representative picture element data $d_{11}$ and $d_{22}$ which are discriminated in the same manner as above description, are recorded in the T register in its proper positions, for example, as indicated by arrows, in orders of the addresses 11, 12, 13, 21, 22, . . . , and 33.

Thus, a combination of the data $D=d_{11}$ and $d_{12}$ recorded in the T register and the pattern data recorded in the I register are processed as the compressed data representing the picture image information of the minute area S.

Figure 13:
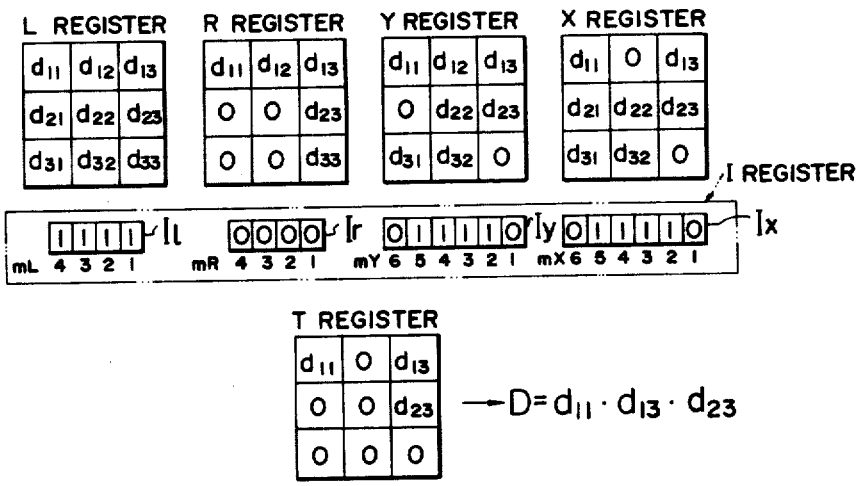
FIG. 13 is a schematic view of the picture element data of the minute area picked up and data written in registers when the density values of the picture element data are three.

In FIG. 13 are shown another minute area S in which there are three density distribution patterns, and the registers. In this embodiment, a combination of the data $D=d_{11}$, $d_{13}$ and $d_{23}$ recorded in the T register and the pattern data recorded in the I register, which are obtained in the same manner as above, are processed as the compressed data.

Figure 14:
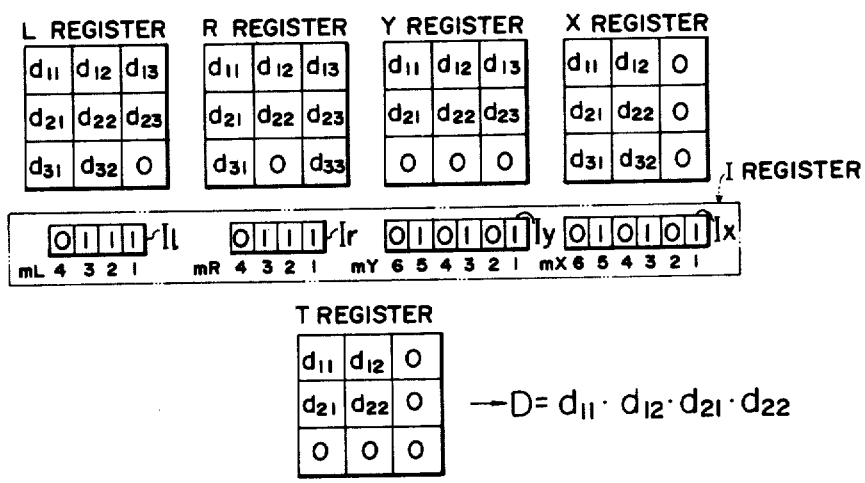
FIG. 14 is a schematic view of the picture element data of the minute area picked up and data written in registers when the density values of the picture element data are four.

In FIG. 14 are shown another minute area S in which there are four density distribution patterns, and the registers. In this embodiment, a combination of the data $D=d_{11}$, $d_{12}$, $d_{21}$ and $d_{22}$ in the T register and the pattern data in the I register, obtained in the same manner as above, are processed as the compressed data.

Then, the compressed data obtained as described above are restored in the followings.

Figure 15:
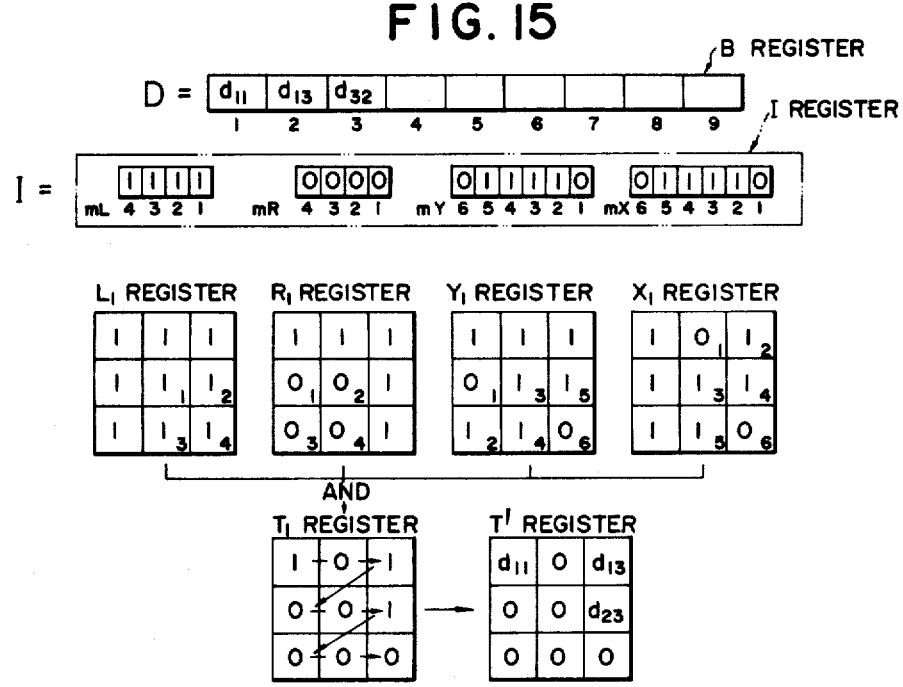
FIG. 15 shows a restoring process of representative data in a T' register according to compressed data D and a data I.

In FIG. 15 there is shown a process for restoring the compressed data for the minute area S shown in FIG. 13. The set of the data D and the pattern data, which represent the picture information of the minute area S, and which are read out of a memory as hereinafter described, are once stored in a buffer register (B register) and the I register whose 20 bits are divided into four groups, i.e. six, six, four and four bits corresponding to the registers Ix, Iy, Ir and Il from the lowermost figure. Each $X_1$, $Y_1$, $R_1$ or $L_1$ register has a matrix of $3 \times 3$ one-bit locations having the same address numbers as those of the X, Y, R or L register shown in FIG. 13.

Each group of the pattern data recorded in the I register are written in the corresponding locations (having the suffix numbers) of each $X_1$, $Y_1$, $R_1$ or $L_1$ register, and in all the other locations (having no suffix number) of the same is written. Then, the logic products of the written values in the $X_1$-$L_1$ registers are calculated in order of the address numbers, thereby obtaining the location addresses of the $T_1$ register, in which the logic product value one or zero is written in, as shown by arrows. Then, the density data $D = d_{11}$, $d_{13}$ and $d_{23}$ recorded in the B register are written in the corresponding address locations of a T' register having a matrix of $3 \times 3$ eight-bit address locations, with the result of the compressed data in the register T, as shown in FIG. 13.

Figure 16:
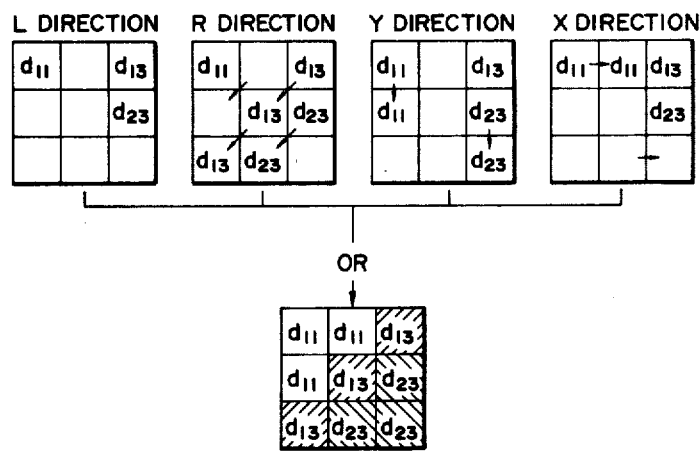
FIG. 16 shows a restoring process of the picture element data in blank parts of the registers according to the representative data in the T' register.

Then, in the addresses of the T' register wherein zero is written, the skipped picture element data having the same density data as those of the representative data $d_{11}$, $d_{13}$ and $d_{23}$, i.e. the representative data $d_{11}$, $d_{13}$ and $d_{23}$ are restored in each comparing X, Y, R or L direction in order of the X-L directions, thereby restoring the matrix of the picture element data representing the minute area S, as shown in FIG. 16.

Next a principle of multiple compression or reduction will be described.

The embodiments of the compression of the matrix of $3 \times 3$ picture element data $d_{11}$-$d_{33}$ of the minute area S have been described. However, the compression of the matrix of $3 \times 3$ minute areas $S_{11}$-$S_{33}$ of a area Z, as shown in FIG. 17, is then carried out in the same manner as described above. This kind of compression may be repeated in many times or the area to be compressed may be extended.

In FIG. 18 are shown the matrix of minute areas $S_{11}$-$S_{33}$ of the area Z together with their compressed density data $D_{11}$-$D_{33}$ and pattern data $I_{11}$-$I_{33}$. Each density data $D_{11}, \ldots$ or $D_{33}$ represents the representative picture element data for the minute area S, and each pattern data $I_{11}, \ldots$ or $I_{33}$ represents the 20 bits of pattern data recorded in the I register for the minute area S.

A minute area $S_{ij}$ is represented by a combination of groups of the density data $D_{ij}$ and the pattern data $I_{ij}$. If the density data $D_{ij}$ and the pattern data $I_{ij}$ are the same as those of an adjacent minute area $S_{i'j'}$, the adjacent minute area $S_{i'j'}$ may be expressed by the density data $D_{ij}$ and the pattern data $I_{ij}$ of the minute area $S_{ij}$.

The adjacent minute area $S_{i'j'}$ (hereinafter referred to as a comparative area) to be compared with the minute area $S_{ij}$ (hereinafter referred to as an objective area) in each of X, Y, R and L directions are expressed in the same manner as shown in FIG. 6.

In practice, the comparison of the comparative area $S_{i'j'}$ with the objective area $S_{ij}$ is conducted by comparing the density data $D_{i'j'}$ and the pattern data $I_{i'j'}$ of the comparative area with those $D_{ij}$ and $I_{ij}$ of the objective area $S_{ij}$. The comparing results are recorded in J and K registers by one-bit data, which correspond to the I register used in the compression of the minute area S.

Figure 19:
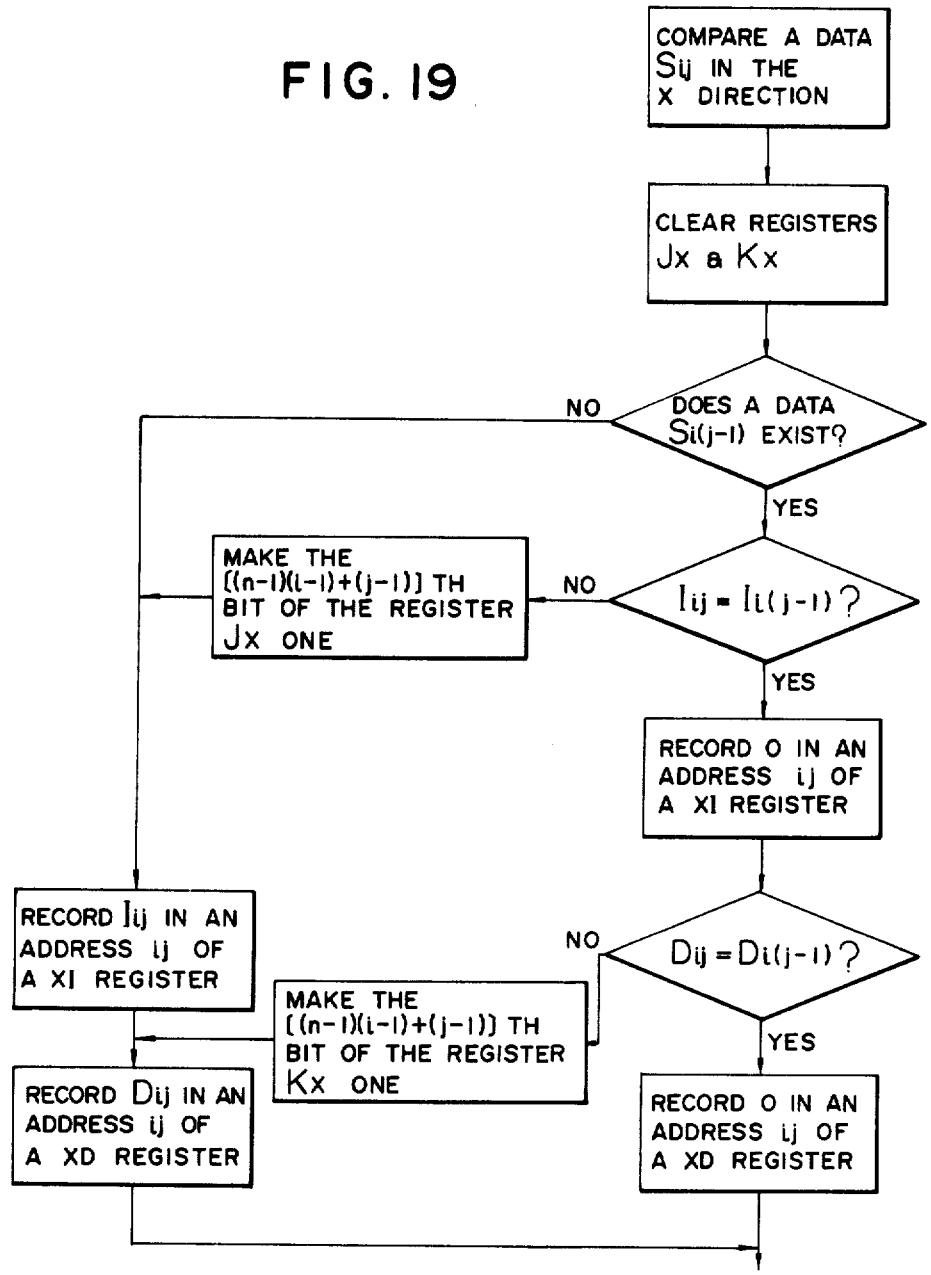
FIG. 19 shows a flow chart for comparing a minute area in X direction in the double compression operation.

In FIG. 19 is shown a flow chart for comparing the minute area $S_{ij}$ with the adjacent minute area in the X direction. The other flow charts for comparing the minute area in the other directions are the same as the one of the X direction except the directions. Hence, the examples of the other flow charts of the Y, R and L directions are not shown. This comparing operation is carried out in the same manner as that shown in FIG. 7.

The J and the K registers of 20 bits are composed of Jx, Jy, Jr and Jl registers and Kx, Ky, Kr and Kl registers in X, Y, R and L modes, respectively, the former twos, i.e. Jx, Jy, Kx and Ky registers, being of six bits and the latter twos, i.e. Jr, Jl, Kr and Kl registers, being of four bits. The combination of the J and the K registers corresponds to the I register for use in the compression of the minute area S, as described above.

The pattern data $I_{ij}$ are recorded in XI, YI, RI and LI registers, each having a matrix of addresses, in X, Y, R and L modes. The density data $D_{ij}$ are recorded in XD, YD, RD and LD registers, each having a matrix of addresses, in X, Y, R and L modes. In the comparing operation in X mode, as shown in FIG. 19, the registers Jx, Kx, XI and XD are used.

Each combination of XI and XD; YI and YD; RI and RD; or LI and LD registers correspond to the X, and Y, the R or the L register for the compression of the minute area S. By using combinations of the J register and each XI, YI, RI or LI register; and the K register and each XD, YD, RD or LD register, the data are processed as shown in FIG. 19, in the similar manner to those shown in FIGS. 11-14, thereby obtaining the double compressed pattern data $I^2$ and the double compressed density data $D^2$ which are recorded in IT and DT registers which correspond to the T register shown in FIGS. 11-14.

In the IT and the DT registers only the representative pattern data $I_{11}$-$I_{33}$ and the representative density data $D_{11}$-$D_{33}$ for the minute areas $S_{11}$-$S_{33}$ of the area Z are recorded, that is, the pattern data $I_{11}$-$I_{33}$ representing the same pattern and the density data $D_{11}$-$D_{33}$ representing the same pattern are skipped except each one data.

For example, when all the minute areas $S_{11}$-$S_{33}$ are the same, as in the similar manner to the embodiment shown in FIG. 11, the data are compressed in the maximum amount, and thus the area Z is expressed by the data for the minute area $S_{11}$. The entire bits numbers required are 68 bits altogether which equals to 8.5 bytes, that is, 40 bits, i.e. 20 bits for each of the J and the K registers, and 20 bits for the pattern data $I_{11}$, and 8 bits for the density data $D_{11} = d_{11}$ for the minute area $S_{11}$.

Meanwhile, when the compression is carried out one time, as shown in FIG. 11, the required entire bit numbers of the area Z are 252 bits = 31.5 bytes altogether, that is, 28 bits which is sum of 20 bits for the I register and 8 bits for the data $d_{11}$, multiplied by nine. When no compression is done, the entire bit numbers required of the area Z are $9 \times 9 \times 8$ bits which equals 81 bytes.

As described above, a standard picture element of a color scanner is a square of side 0.05 mm. Accordingly, the size of the area Z shown in FIG. 17 is a small square of side 0.45 mm. Thus, the probability that the data of the minute areas $S_{11}$-$S_{33}$ of the area Z are different from one another, is very small, and therefore the double compression may be very effectively applied.

Figure 20:
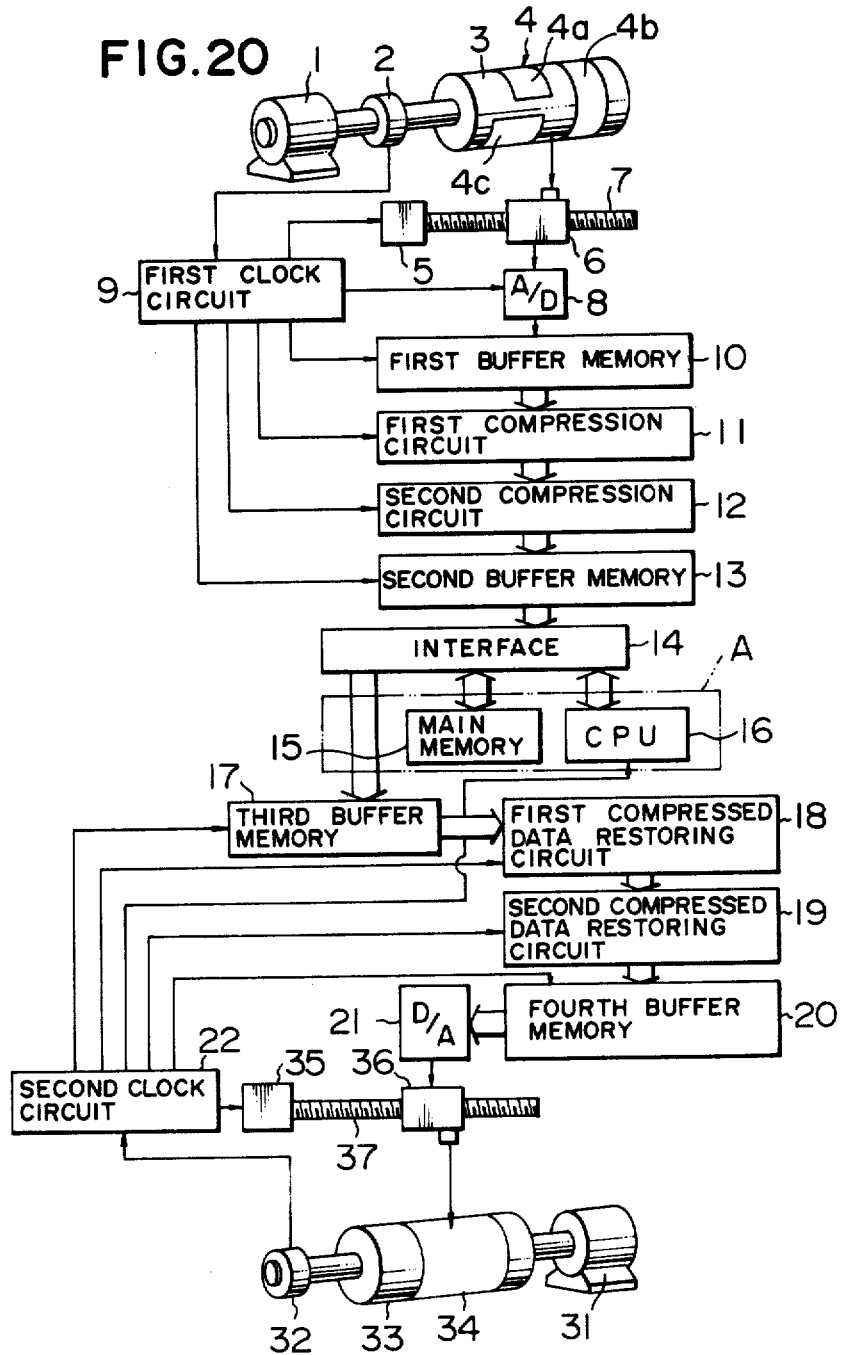
FIG. 20 is a schematic view of a layout scanner which is capable of performing a method according to the present invention.

In FIG. 20 is shown a color scanner for plate-making, to which the present invention is applied.

A motor 1 rotates a picture cylinder 3 on which original pictures 4 are secured, via a drive shaft. A rotary encoder 2 is coaxially mounted to the drive shaft with the picture cylinder 3, and generates clock pulses corresponding to the rotating speed of the cylinder 3. The clock pulses are sent to a first clock circuit 9.

A pickup head 6 for scanning the original pictures 4 is moved in a direction of cylinder's axis along a screw rod 7 by a motor 5. The pickup head 6 picks up a density information of the original picture 4 as an analog picture signal by scanning. The analog picture signal is converted into a digital picture signal in an analog-digital converter 8. The digital picture signal is sent to a first buffer memory 10 in synchronization with a timing signal generated by the first clock circuit 9, and is stored there.

In order to carry out the double compression nine scanning lines of digital picture signals are consecutively stored in the first buffer memory 10. The nine lines of digital picture signals read out of the first buffer memory 10 are divided into three three-scanning-lines groups in the direction of cylinder's axis and three three-sampling-pitches groups in a direction of cylinder's periphery, thereby obtaining the 81 picture element data $d_{11}$–$d_{99}$ of nine minute areas $S_{11}$–$S_{33}$ of one area Z. Then, the first compression operation of the 81 picture element data $d_{11}$–$d_{99}$ of the area Z is performed in a first compression circuit 11, as described above, to obtain the compressed data, i.e. the nine pattern data $I_{11}$–$I_{33}$ and the nine density data $D_{11}$–$D_{33}$ for the nine minute areas $S_{11}$–$S_{33}$. These once-compressed data are sent to a second compression circuit 12.

In the second compression circuit 12, the second compression operation of the first-compressed data is carried out to obtain the double-compressed data $I^2$, $D^2$, J and K which are consecutively written in a second buffer memory 13.

The positions of the original pictures 4a, 4b and 4c mounted to the cylinder 3 are known in advance by means of address numbers N and M in the directions of cylinder's periphery and cylinder's axis.

A set of double-compressed data $I^2$, $D^2$, J and K having an address number NM, read out of the second buffer memory 13 in order of scanning is discriminated by the address number NM which original picture is connected to. Then, the address of the double-compressed data is changed according to the desired layout for the reproduction, and is stored in a main memory 15 via an interface 14 which is controlled by a central processing unit 16, hereinafter referred to as CPU.

Then, the double-compressed data $I^2$, $D^2$, J and K read out of the main memory 15 while the CPU selects one of the original pictures 4a, 4b and 4c, are written in a third buffer memory 17. The double-compressed data are read out of the third buffer memory 17 to sent them to a first-compressed data restoring curcuit 18. The writing and the reading of the data in and from the third buffer memory 17 are conducted in synchronization with timing pulses generated by a second clock circuit 22.

In the first compressed data restoring circuit 18 from the double-compressed data for the area Z the first-compressed data $I_{11}$–$I_{33}$ and $D_{11}$–$D_{33}$ for the minute areas $S_{11}$–$S_{33}$ are restored, as described before. The first-compressed data restored are sent to a second compressed data restoring circuit 19 in which from the first-compressed data the picture element data $d_{11}$–$d_{99}$ are restored, as described above.

The picture element data restored are once written in a fourth buffer memory 20 and then are read out of the fourth buffer memory 20 in order of scanning in synchronization with timing signals generated by the second clock circuit 22. The picture element data read out are then sent to a digital-analog converter 21 and are converted into analog picture element signals. The analog picture element signals are sent to a recording head 36 for recording a reproduction picture on a photosensitive material 34 secured to a recording cylinder 33.

The recording cylinder 33 is rotated by a motor 31 via a drive shaft, and a rotary encoder 32 coaxially mounted to the drive shaft with the motor 31 generates clock pulses to be sent to the second clock circuit 22. The recording head 36 is moved in a direction of cylinder's axis along a screw rod 37 by a motor 35.

Figure 21:
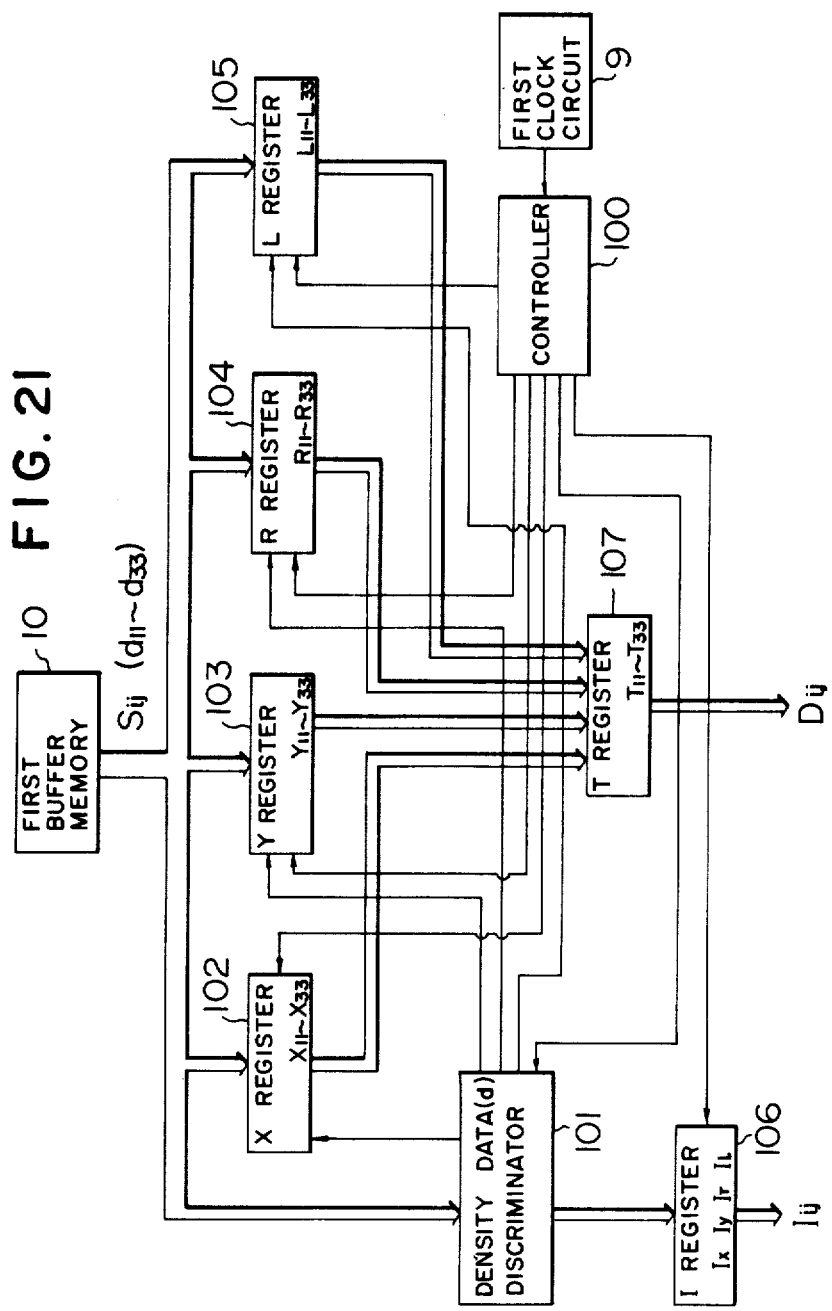
FIG. 21 is a block diagram of one embodiment of a first compression circuit shown in FIG. 20.

In FIG. 21 is shown a block diagram of one embodiment of the first compression circuit 11 of FIG. 20, for processing one minute area S.

A controller 100 sends a control signal to a density data discriminator 101 in synchronization with the clock pulse generated by the first clock circuit 9. Then, the density data discriminator 101 compares the picture element data $d_{11}$–$d_{33}$ fed from the first buffer memory 10 in X, Y, R and L directions according to the flow charts shown in FIGS. 7-10.

The density data discriminator 101 sends the comparison results to X, Y, R and L registers 102, 103, 104 and 105 so that the regosters 102–105 may record the picture element data $d_{ij}$ or zero when the picture element data $d_{ij}$ is skipped, in the corresponding addresses ij. Meanwhile, the comparison results, i.e. the pattern data $I_{ij}$ are sent to an I register 106 and are written there.

The recorded values of X, Y, R and L registers 102, 103, 104 and 105 are sent to a T register 107 by controll signal from the controller 100. In the T register 107 the logic produces of the data in the common addresses of the registers 102–105 are operated to obtain the representative picture element data with their addresses, and/or zero value as described above. Thus the obtained first-compressed data $I_{ij}$ and $D_{ij}$ recorded in the I register and the T register are read out thereof, and are sent to the second compression circuit 12.

Figure 22:
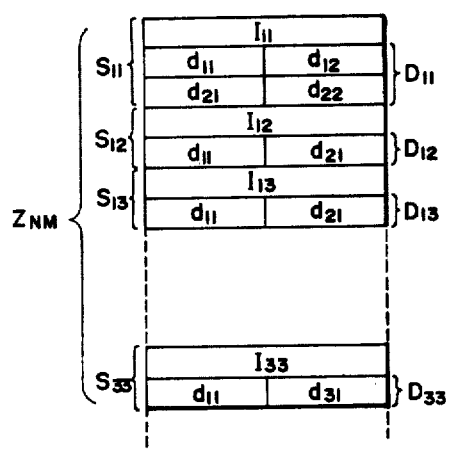
FIG. 22 shows an output data format output from the first compression circuit in FIG. 21.

In practice, this operation is carried out for each of the minute area $S_{11}$–$S_{33}$ at the same time in parallel, and hence the pattern data $I_{11}$–$I_{33}$ and the density data $D_{11}$–$D_{33}$ are output in parallel. Such first-compressed data may be output in a data format, as shown in FIG. 22.

Figure 23:
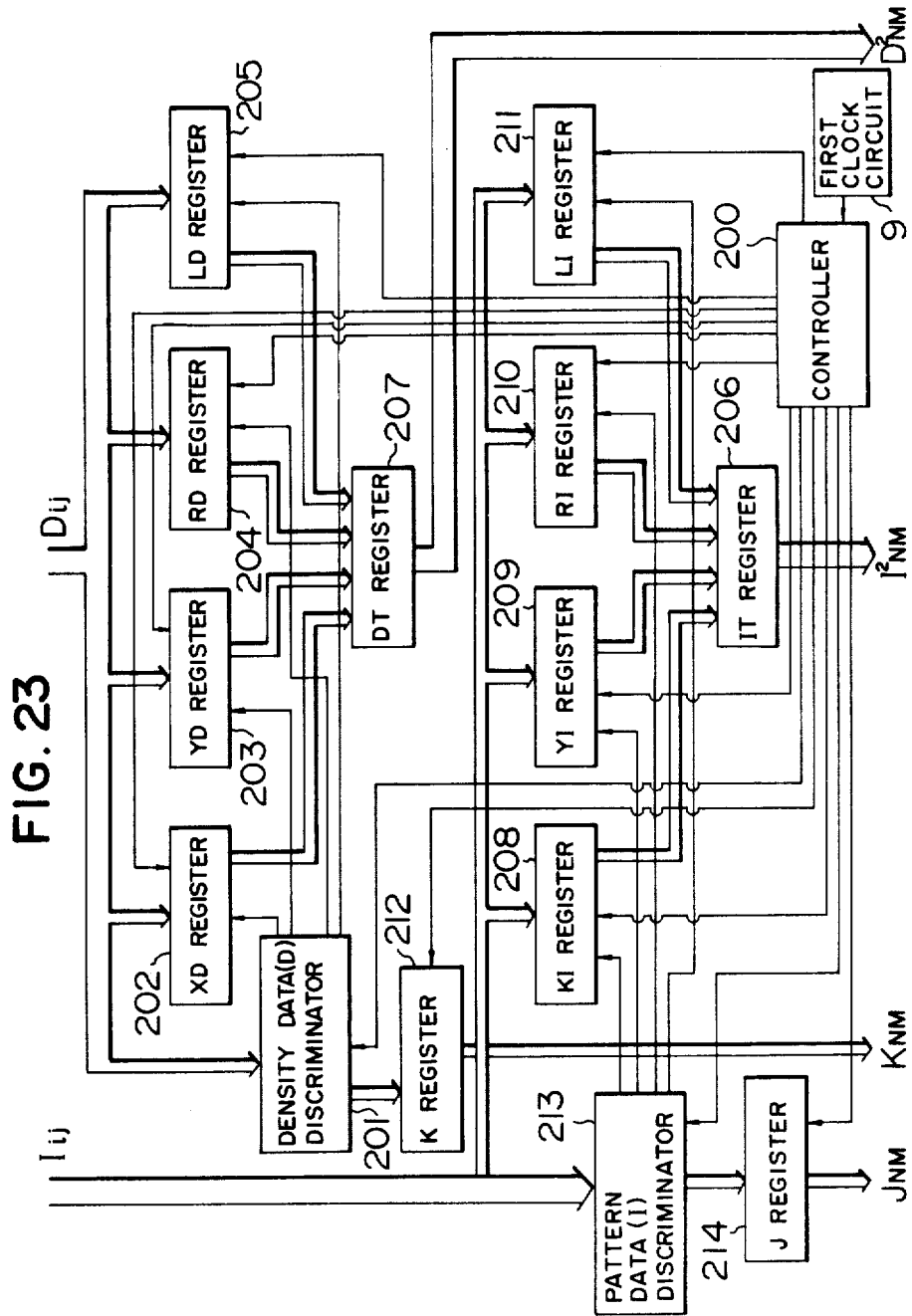
FIG. 23 is a block diagram of one embodiment of a second compression circuit shown in FIG. 20.

In FIG. 23 is shown one embodiment of the second compression circuit 12 shown in FIG. 20.

A controller 200 sends a control signal to a density data discriminator 201 for discriminating whether the comparative minute area adjacent to the objective minute area exists, the first-compressed data $I_{ij}$ and $D_{ij}$ are recorded, as it is, in the registers.

When a comparative minute area exists, the comparing operation is carried out. The controller 200 sends a control signal to a pattern data discriminator 213 for comparing a pattern data $I_{ij}$ with an adjacent pattern data in X, Y, R or L direction, as shown in case of the X direction in the upper half of the flow chart of FIG. 19.

The pattern data discriminator 213 sends the comparison result to XI, YI, RI and LI registers 208, 209, 210 and 211 so that they may record the pattern data $I_{ij}$ or zero when the pattern data is skipped, in the corresponding addresses ij. The comparison result expressed by a one-bit data of one or zero is also sent to the J register 214 and is recorded there.

On the other hand, the density data discriminator 201 compares a density data $D_{ij}$ with an adjacent density data in X, Y, R or L direction, as shown in case of X direction, in the lower half of the flow chart of FIG. 19.

The density data discriminator 201 sends the comparison result to XD, YD, RD and LD registers 202, 203, 204 and 205 so that they may record the density data $D_{ij}$ or zero when the density data is skipped, in the corresponding address ij. The comparison result expressed by a one-bit data one or zero is recorded in a K register 212.

The recorded values of XD, YD, RD and LD registers 202-205 are sent to a DT register 207 by control signals from the controller 200, and in the DT register 207 the logic products of the density data in the common addresses of the registers 202-205 are calculated, thereby obtaining the representative density data having addresses, and/or zero value. Then, the double-compressed density data $D^2$ are read out of the DT register 207, and are then recorded in the second buffer memory 13.

The recorded values of XI, YI, RI AND LI registers 208-211 are sent to a IT register 206 by control signals from the controller 200, and in the IT register 206 the logic products of the pattern data in the common addresses of the registers 208-211 are operated to obtain the representative pattern data having the addresses, and/or zero value. Then, the double-compressed pattern data $I^2$ are read out of the IT register 206 and are then recorded in the second buffer memory 13.

The discrimination data K and J having the addresses, recorded in the K and the J registers 212 and 214 are also read out thereof, and are sent to the second buffer memory 13 together with the density data $D^2$ and the pattern data $I^2$. That is, sets of double-compressed data $D^2$, $I^2$, K and J having addresses NM of the area $Z$ are recorded in the second buffer memory 13.

Figure 24:
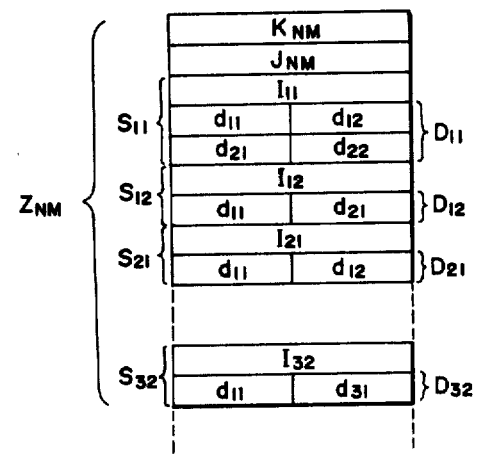
FIG. 24 shows an output data format output from the second compression circuit in FIG. 23.

In FIG. 24 is shown a example of a data format of the double-compressed data of the area $Z_{NM}$, output from the second compression circuit 12, wherein sets of the representative density data $D_{11}$-$D_{33}$ of the double-compressed density data $D^2$ and the representative pattern data $I_{11}$-$I_{33}$ of the double-compressed pattern data $I^2$ for the minute areas $S_{11}$-$S_{33}$ are arranged in order of their address numbers. These double-compressed data are once written in the second buffer memory 13 by means of the data format, are read out of the second buffer memory 13, and then are recorded in the main memory 15.

Figure 25:
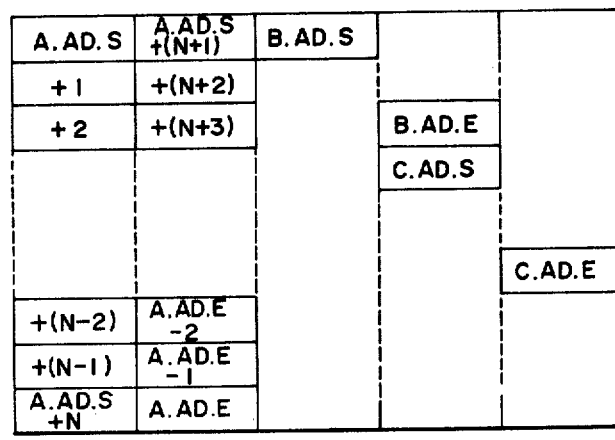
FIG. 25 is a memory map of data stored in a main memory shown in FIG. 20.

In FIG. 25 is shown a memory map of the double-compressed data of the original pictures 4a, 4b and 4c, stored in the main memory 15.

When the compressed data $[(D^2)(I^2)(K)(J)]_{NM}$ of the area $Z_{NM}$ read out of the second buffer memory 13 are written in the main memory 15 via the interface 14, the CPU 16 controls the memory areas for the original pictures 4a, 4b and 4c and memorizes the address numbers for the original pictures 4a, 4b and 4c.

When the CPU 16 instructs the reading out the data for each original picture 4a, 4b or 4c of the main memory 15, the data from the start address to the end address for the original picture read out. For example, when the original picture 4a is selected, the data for the original picture 4a between start and end address marks A.AD.S and A.AD.E (A picture address start and A picture address end) are read out of the main memory 15 and then are once written in the third buffer memory 17. The data for the original picture 4b or 4c are arranged between start and end address marks B.AD.S and B.AD.E, or C.AD.S and C.AD.E, as shown in FIG. 25.

Figure 26:
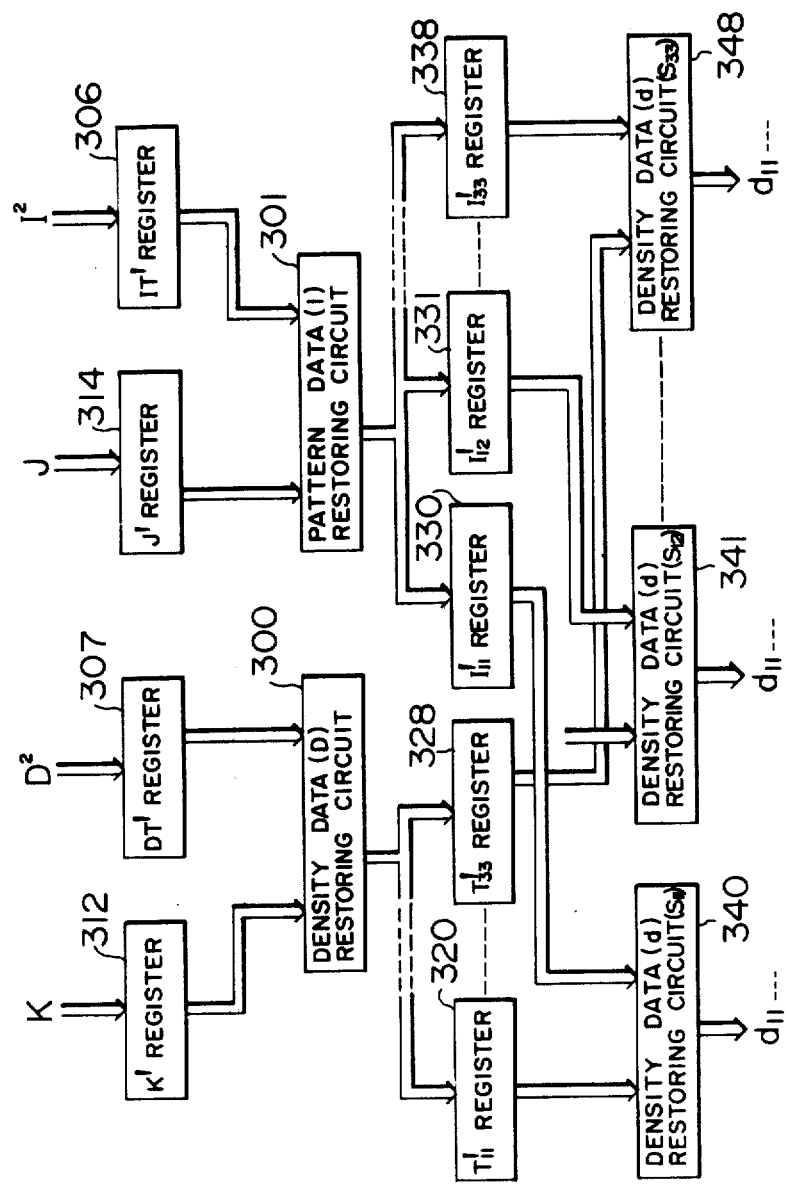
FIG. 26 is a block diagram of one embodiment of a combination of first and second compression data restoring circuits shown in FIG. 20.

FIG. 26 shows one embodiment of the first and the second compressed data restoring circuits 18 and 19 shown in FIG. 20.

A set of the double-compressed data K, $D^2$, J and $I^2$ of the area Z read out of the third memory 17 are once stored in K', DT', J' and IT' registers 312, 307, 314 and 306, corresponding to the K, the DT, the J and the IT registers shown in FIG. 23. Then, the data K and $D^2$ are sent to a density data restoring circuit 300, and the data J and $I^2$ are sent to a pattern data restoring circuit 301. In the two restoring circuits 300 and 301 the once-compressed data $I_{11}$-$I_{33}$ and $D_{11}$-$D_{33}$ of the minute areas $S_{11}$-$S_{33}$ are restored from the double-compressed data, in the same manner as described above in connection with FIGS. 15 and 16.

The density data $D_{11}$-$D_{33}$ and the pattern data $I_{11}$-$I_{33}$ are once recorded in $T_{11}'$-$T_{33}'$ registers corresponding to the T register used in the compression operation and $I_{11}'$-$I_{33}'$ registers corresponding to the I register used in the compression operation. Then, the nine sets of data ($I_{11}$ and $D_{11}$), . . . , and ($I_{33}$ and $D_{33}$) read out of the $T_{11}$-$T_{33}$ registers and the $I_{11}$-$I_{33}$ registers, are sent to nine density data restoring circuits 340-348 for the minute areas $S_{11}$-$S_{33}$.

In each density data restoring circuit 340, . . . or 348, the nine picture element data are restored in the same manner as described above with reference to FIGS. 15 and 16. The restored picture element data are fed to the fourth buffer memory 20 and are stored there. Then, the picture element data are consecutively read out of the fourth buffer memory 20 in order of scanning and are sent to the recording head 21 in order to record the reproduction pictures on the photosensitive material 34 mounted to the recording cylinder 33. In this case, the layout of the reproduction pictures is performed by controlling the reading out the data stored in the main memory 15.

According to the present invention the area Z is not restricted to a matrix of 3×3 minute areas, and, of course, it may be composed of a matrix of n×n minute areas (n equals 1, 2, 3, 4, . . . ). Further, the compression process is not restricted to at most two, and, of course, it may be more than three.

According to the present invention, the main memory and the CPU indicated by A of FIG. 20 may be replaced with a modem (modulator-demodulator), which is effectively utilized in a transmission scanner or facsimile for band area compression.

Although the present invention has been described in terms of a preferred embodiment thereof, illustrated in the accompanying drawings, however, various changes and modifications can be made by those skilled in the art without departing from the scope of the present invention.

What is claimed is:

1. A method for compressing picture data, wherein an original picture is scanned photoelectrically to obtain analog picture signals which are converted in an analog-digital converter into picture data to be transmitted or stored in a memory, comprising the steps of:

(a) comparing each of a matrix of picture data having addresses with an adjacent picture data in horizontal, vertical, right upper diagonal and left upper diagonal directions to obtain comparison results; and (b) skipping either each picture data or its adjacent picture data according to the comparison results when the two picture data have the same value, to obtain compressed data consisting of representative data which cannot be skipped.

2. A method as defined in claim 1, further comprising restoring the matrix of picture data again based on the comparison results and the compressed data.

3. A method as defined in claim 1 or 2, wherein each picture data comprises a picture element data.

4. A method as defined in claim 1 or 2, wherein each picture data comprises a plurality of picture element data.

5. A method as defined in claim 1 or 2, wherein each picture data comprises the compressed data.

* * * * *